March 11, 1941.                G. N. EDWARDS                    2,234,839
                METHOD OF MAKING FLOOR COVERINGS AND THE LIKE
                    Filed Dec. 17, 1934            2 Sheets-Sheet 1

INVENTOR.
GEORGE N. EDWARDS
BY
Kwis Hudson & Kent
ATTORNEYS

March 11, 1941. G. N. EDWARDS 2,234,839
METHOD OF MAKING FLOOR COVERINGS AND THE LIKE
Filed Dec. 17, 1934 2 Sheets-Sheet 2
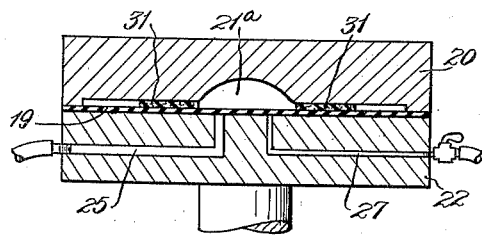
FIG. 8
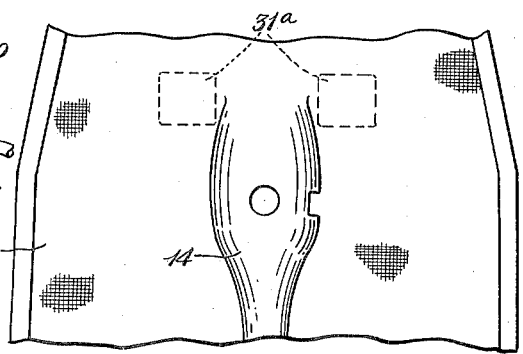
FIG. 10
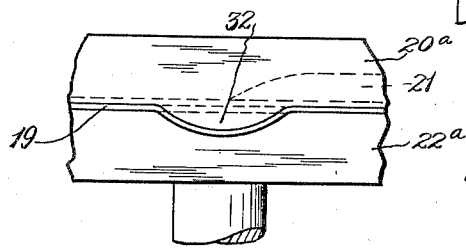
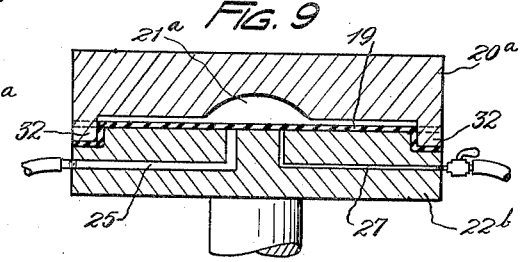
FIG. 9
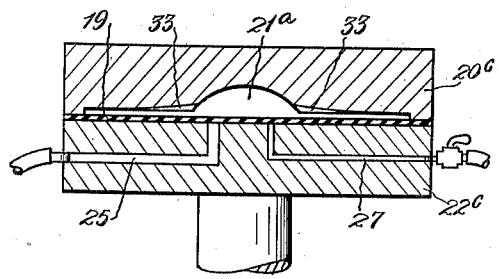
FIG. 12
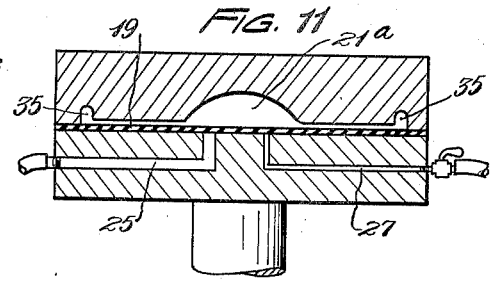
FIG. 13
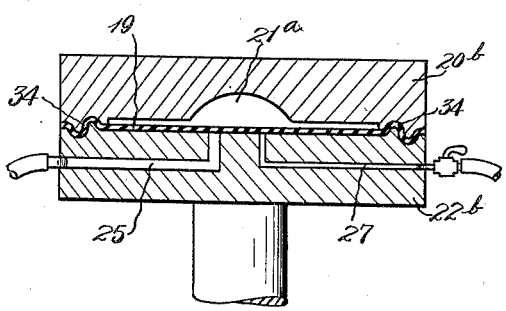
FIG. 14
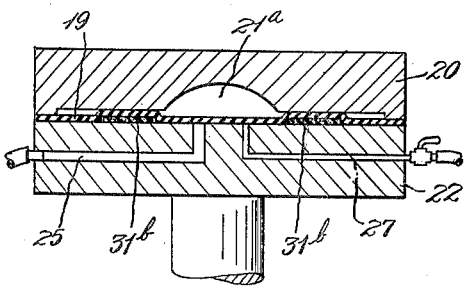
FIG. 15
INVENTOR.
GEORGE N. EDWARDS
BY
Kwis Hudson & Kent
ATTORNEYS Patented Mar. 11, 1941

2,234,839

UNITED STATES PATENT OFFICE 2,234,839

METHOD OF MAKING FLOOR COVERINGS AND THE LIKE

George N. Edwards, Willoughby, Ohio, assignor to The Ohio Rubber Company, Willoughby, Ohio, a corporation of Ohio Application December 17, 1934, Serial No. 757,865

3 Claims. (Cl. 18—56)

This invention relates to a method of making floor mats and the like from rubber or other materials initially plastic, such as the materials in the group of thermoplastics.

It is desirable at times to produce molded articles which are relatively thin and of considerable area and which are required to have such contour that they are difficult to mold directly into their final shape by molding or molding and curing steps, either on account of difficulties in so doing by reason of their shape or because of prohibitive mold costs. Among these members or articles might be mentioned rubber floor mats designed to conform to irregularities of the surface to be covered, such as floors of front and rear automobile compartments, linings for automobile tops formed from rubber or other suitable moldable material, and other articles which must be formed in other than a flat shape.

The principal object of the present invention is to provide a method or process by which articles of the kinds mentioned above can be produced effectively and economically, and especially without requiring the use of expensive molds.

The invention may be here briefly summarized as consisting in a process involving the novel combination of molding and shaping steps or operations which will be described in the specification and set forth in the appended claims.

In the accompanying sheets of drawings wherein I have shown apparatus which may be used in carrying out the steps of the method in its preferred embodiment and which show in its intermediate and final stages a floor mat produced by the method:

Fig. 8 is a view similar to Fig. 7, showing a slight modification in the contouring press, the press here shown having provision on the lower side of the upper mold member for holding portions of the mat to be contoured from excessive stretching;

Fig. 9 shows a portion of the contoured mat, illustrating the location of the mat engaging members of Fig. 8 to hold the mat against stretching in certain regions;

Fig. 10 is a fragmentary side view of a modified contouring press showing means for giving certain marginal portions of the mat a preliminary mechanical stretching to prevent excess stretching in certain regions by the fluid pressure in the contouring operation;

Fig. 11 is a cross-sectional view of the contouring press shown in Fig. 10;

Figs. 12, 13 and 14 are views similar to Fig. 11 showing still further modifications in the contouring press; and Fig. 15 is a view of a contouring press utilizing the mat holding means shown in Fig. 8 but arranged somewhat differently.

Figure 4:
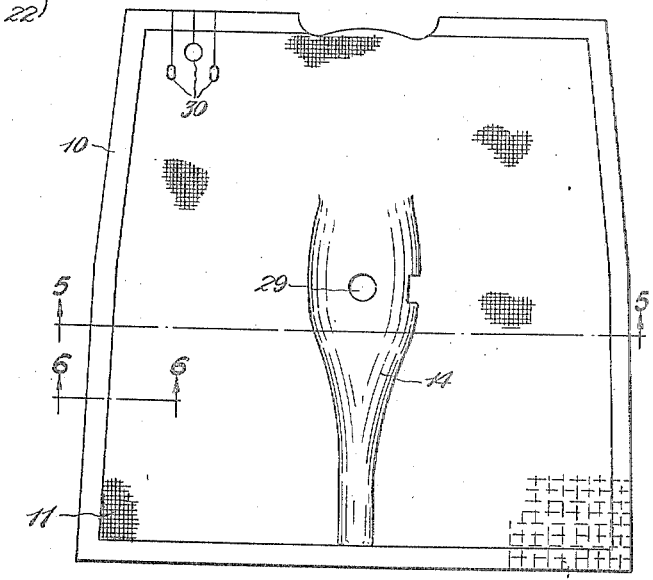
Fig. 4 is a plan view of the completed mat.

In Fig. 4 I have shown, by way of example of many different products which may be produced in accordance with the present invention, a flexible rubber mat 10 for the front compartment of an automobile. These mats are always provided on the top surface with a durable but pleasing or artistic design or configuration which, in this instance, consists of a series of adjacent raised portions 11 which to a more or less extent simulate tapestry carpet. In many instances the lower side of the mat is smooth and without any particular design, and at times there is applied to the lower surface a layer of felt. In other instances the lower side of the mat may have a special configuration or design, as, for example, flexible intersecting walls 12 forming air pockets 13, this type of mat doing away with the necessity for felt on the lower side of the mat since the air cells provide insulation against the transmission of heat and sound, and the intersecting walls afford resilience or cushioning effect. In order that the mat may have the necessary characteristics for use and economical manufacture, and for various other reasons the part of the mat forming the top or tread portion is composed of relatively hard rubber composition and the portion forming the air cells is formed from a layer of rubber of relatively soft composition, the two layers being of course integrally united during the molding and vulcanizing operation. However, as stated above, a special design or configuration need not be imparted to the lower side of the mat, in which event the latter will generally be formed of a single layer of rubber of uniform composition.

My invention is applicable to and includes the formation of products regardless of whether they are provided on either side with a special design or configuration in the first molding operation, but it is particularly efficacious when employed for the production of products having on one or both sides a design or configuration imparted during the first molding operation, for it is a feature of the present invention that in the second step of the process wherein the product is contoured by heat and pressure, preferably fluid pressure, the design or configuration, whether applied to one or both sides of the article, is not in any way disturbed or affected.

Figure 5:
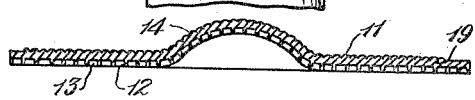
Fig. 5 is a sectional view substantially along the line 5—5 of Fig. 4.

Referring again to Fig. 4 and also to Fig. 5, it will be noted that the mat is provided with an upward bulge or hump 14 located between the side edges and extending a considerable distance from near the front edge to the upper or far edge. This deformation or hump is provided in order that the mat will conform to a corresponding hump provided in the floor of the automobile compartment which is elevated at the center to accommodate the top of the transmission and a portion of the drive shaft. In order that the mat may conform to the hump in the floor of the compartment, it must be formed or contoured to that shape, but this contour cannot be imparted to the mat when it is initially molded. In accordance with the present invention, the mat is first molded by mechanical pressure in a flat shape and vulcanized precisely as though the mat were to be laid over a flat floor, and in this molding operation or molding and vulcanizing operation, there is imparted to the top surface whatever design the tread portion of the mat is to have, and if the lower surface of the mat is to have a special configuration, such as intersecting walls to form air cells, these are at the same time imparted to the lower or bottom portion of the mat. Then in a subsequent operation the formed and vulcanized mat is contoured by the application of heat which temporarily softens it or removes its tensile strength, and, by the application of fluid pressure, the heat and pressure being preferably applied by live steam, the mat is stretched and contoured or given the desired shape to conform to the surface against which it is to lie, and, in so doing, the contoured part is given a permanent set so that it retains the shape given to it in the second or contouring operation.

Figure 1:
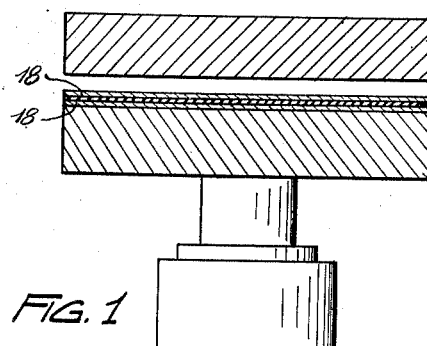
Fig. 1 is a conventional representation of a vulcanizing press which may be used in the first molding and vulcanizing operation.

As stated above, the initial molding is accomplished by mechanical pressure, and while this may be performed in different ways, I prefer to use for this purpose the conventional vulcanizing press, such as indicated in Fig. 1, wherein 15 designates the ram or movable platen which is generally actuated by hydraulic pressure, and 16 is a cooperating stationary platen or head, the press being shown open in Fig. 1. Between these relatively movable platens are placed one or more layers of unvulcanized rubber, indicated at 17 in Fig. 1, and one or more mold forms 18, depending upon whether a design or configuration is to be imparted to one or both surfaces of the mat, but in this instance on both sides since the mat here illustrated not only has on its tread surface an artistic design or configuration, but also has on its lower surface intersecting ribbing to form air cells. Thus the mat is molded and vulcanized in a flat state indicated at 19 in Fig. 2. So far as this step of the process is concerned, other modes of molding by mechanical pressure and of vulcanizing may be employed.

Next the flat molded and vulcanized mat 19 is subjected to a second molding or contouring operation utilizing live steam. For this purpose I prefer to employ a press substantially as shown conventionally in Fig. 3, the same comprising an upper mold member 20 the under surface of which has a cavity 21 corresponding to the deformation or hump 14 to be given to the mat. In other words, the under surface of the mold member 20 has a contour corresponding to the contour which the finished mat is to have. Additionally, the press has a movable mold member 22 which, when elevated, clamps the previously molded and vulcanized mat 19 between the mold members 20 and 22, the clamping pressure being exerted only around the margin of the mat with a pressure sufficient to prevent the escape of steam at any point around the margin. To facilitate the sealing action around the margin of the mat, I may provide one of the mold members with a groove 23 and the other with a corresponding ridge 24, the groove and ridge being adapted to tightly engage the marginal portion of the mat all around its perimeter.

The lower mold member 22 has a passageway 25 to the outer end of which a steam supply pipe 26 is connected, this passageway extending inwardly and upwardly so as to discharge steam under the mat directly beneath the cavity 21 in the upper mold member. Likewise, the lower mold member has a steam outlet passageway 27 preferably of smaller size than the inlet passageway 25, this passageway leading from the upper face of the mold member 22 beneath the cavity 21 and extending laterally to the side of the mold member where it may be provided with an adjustable valve 28 and a pipe to carry away the exhaust steam.

In operation, the press is opened and one of the flat molded and vulcanized mats 19 is placed on the lower mold member, and the press is then closed so as to grip the mat around its margin and form a seal. Hot steam under pressure is then admitted, the temperature and pressure being such as to soften the mat somewhat and decrease its tensile strength and to stretch the mat and make it conform to the lower face of the upper mold member 20, completely lining the cavity 21. After a brief interval, which generally does not exceed a minute, the supply of steam is shut off, the pressure is gradually reduced by the steam bleeding through the outlet passageway 27, and the mat quickly cools and recovers its so-called tensile, but in this molding operation under heat and pressure conditions, the stretched rubber receives a permanent set, and when the pressure and temperature are reduced, the mat retains the shape which it received under the action of the steam pressure.

Figure 3:
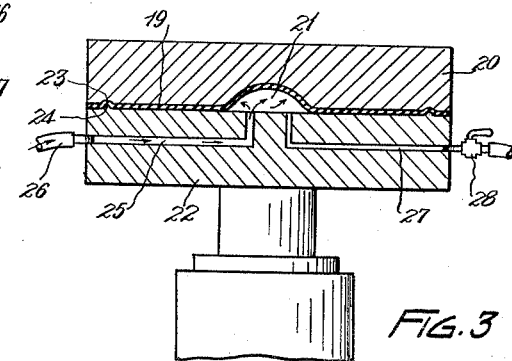
Fig. 3 is a view of a press or mold which may be used to carry out the second main step of the process wherein the article produced in the press of Fig. 1 is subjected to the action of heat to temporarily decrease its tensile strength and to fluid pressure to stretch and contour portions of the mat to the shape of the under side of the upper mold member of the press.
Figure 2:
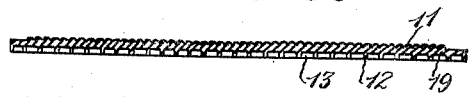
Fig. 2 is a sectional view on a slightly enlarged scale through the mat as produced in the press of Fig. 1.

It is important to note that though the fluid pressure is sufficient, in the presence of heat, to stretch the mat and make it conform to the cavity of the upper mold member, the molded design which may previously have been given to the flat molded mat 19 is not affected by the pressure of the mat on the lower face of the upper mold member, nor is the molded effect which may have been given to the lower side of the mat, as in the mat 19 of Fig. 2, changed or affected by the action of the steam, though the pressure is sufficient to contour the mat in the manner shown in Fig. 3.

After the contoured mat is removed from the press, it is trimmed around its margin, and in the same operation it may be provided with whatever cutouts 29 and 30 may be necessary to adapt it for the intended purpose.

After the mat is contoured in the manner explained above, its strength, durability, and flexibility are not impaired, in fact its durability and other desirable characteristics may be enhanced by the contouring step, especially as the mat may be somewhat undercured when first molded and vulcanized, and its curing will then be completed in the contouring operation. It might be mentioned that the steam pressure is preferably admitted to the under side of the mat during the contouring for under these circumstances steam condensate is more easily carried away through the outlet passageway 27 than would otherwise be the case.

Figure 7:
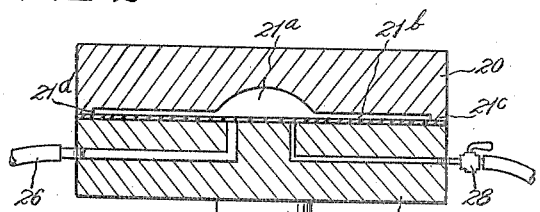
Fig. 7 is a sectional view similar to Fig. 3 showing a slightly modified contouring press.
Figure 6:
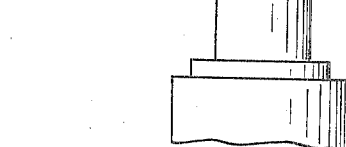
Fig. 6 is a fragmentary sectional view, on an enlarged scale, substantially along the line 6—6 of Fig. 4.

In Fig. 7 I have shown a contouring press which is slightly different from that illustrated in Fig. 3. In this instance, the lower mold member 22 is precisely the same as that shown in Fig. 3, but the upper mold member 20 has a cavity, here designated 21a, having a flat shallow portion 21b which extends from the hump forming portion over the entire area of the mat inside the marginal clamping portion 21c of the mold member. The result of this is that when steam pressure is applied, the entire mat inside the perimeter which is clamped to form the seal or gasket is lifted and stretched, the stretching occurring all over the mat instead of being concentrated in that region of the mat which forms the hump or deformation 14. This stretching over the whole mat surface during the contouring operation avoids the likelihood of wrinkles being formed in any part of the finished mat which will, of course, be trimmed off around its margin just inside the shoulder 21d of the marginal portion 21c of the upper mold member 20. Obviously, with the contouring press or mold shown in Fig. 5, the results are precisely the same as before, with the exception that the stretching is over a larger area and the possibility of wrinkles is eliminated. Furthermore, the mat contoured in a press such as shown in Fig. 7 will have the same thickness throughout, whereas with a contouring press as shown in Fig. 3 the material will generally be slightly thinner where the hump occurs than in the area surrounding the hump or where the mat is flat.

It has been found that where the hump or deformation terminates suddenly or sharply in the mat, there are likely to be one or more slight folds in the finished mat adjacent the point where the hump is terminated, i. e., lying in a section of the mat a few inches wide extending from one side edge to the other adjacent the termination of the hump. This is due to the fact that in this section or region just stated a certain amount of stretching occurs crosswise of the mat just beyond the hump where, in fact, no stretching is desired. This at times causes a slight excess of material which takes the form of a slight fold in the mat. While this does not occur in all the contoured mats which are made in the manner described above, it can be eliminated entirely by one of several possible procedures or expedients. For example, the mat may be held against excessive stretching in a section of the mat extending crosswise thereof adjacent the point where the hump terminates by yieldingly holding the rubber where the stretching is to be reduced, as by attaching to the inner face of one of the mold members pieces 31 of suitable material which are adapted to engage the mat on opposite sides of the end of the hump in the plane or section referred to at substantially the location or points indicated by the dotted lines 31a of Fig. 9. Pieces of sponge rubber or other suitable soft material can be advantageously used for this purpose. These pieces of sponge rubber or the like may be attached to the lower face of the upper mold member, as in Fig. 8, but preferably to the upper face of the lower mold member, as indicated at 31b in Fig. 15. If the upper face of the mat has a molded contour and if the lower face is plain or flat, as is the case in most instances, then the arrangement of the mat engaging pieces for the purpose stated shown in Fig. 15 is preferred, for in that case there would be eliminated entirely any danger of the pieces marring or leaving any imprint on the molded upper face of the mat.

Instead of holding the rubber against stretching in the regions specified, I may give the mat a preliminary mechanical stretching at opposite points or parts of the sides of the mat in the region or section specified, and this can be done as the molded mat is clamped between the mold members of the contouring press by properly shaping the marginal clamping portions but only at the ends of the section where it is desired to decrease the stretching by the fluid pressure. One way of doing this is indicated in Figs. 10 and 11 where, for a short distance, indicated at 32, along each side of the mold at the ends of the section referred to, the adjacent marginal or clamping portions of the mold members 20a and 22a, instead of being flat, are given an irregular contour, as by being curved downwardly when the mold is viewed from the side, as in Fig. 10, so as to mechanically stretch the cured rubber when the parts of the contouring mold come together.

Another way of giving the adjacent portions of the sides of the mold members an irregular shape which will give a preliminary mechanical stretching to the rubber at the ends of the section specified is indicated in Fig. 14 where the two parts of the mold, for a short distance on each side, are given a corrugated shape indicated at 34, the mold members of this figure being designated 20b and 22b.

Instead of giving the opposite marginal portions of the mat a mechanical preliminary stretching, the excess material, due to excessive stretching in the region specified, can be absorbed by providing space for that purpose in the upper mold member. For example, as shown in Fig. 12, the sides of the cavity 21a at or near the region where the cavity ends may be tapered off, as indicated at 33 in Fig. 12, where the upper and lower mold members are designated 20c and 22c. Of course, this is only in the region or section previously referred to where the excess stretching occurs, and, except for these regions which would not be very wide, the lower side of the mold cavity surrounding the cavity will be flat, as shown in Figs. 3 and 7. A mat contoured with the mold members shown in Fig. 12 will, after the contouring operation, have a slight convexity or curvature where the tapered portions 33 are provided in the lower face of the upper mold member, but this will be so slight as to be practically unnoticeable.

Instead of taking care of the excess material in the regions stated in the manner illustrated in Fig. 12, I may provide extra space to take up this excess material, due to excessive stretching in the regions stated, by providing in the lower face of the upper mold member at the ends of this region or transverse section recesses 35 very close to the marginal clamping portions of the mold members. These recesses 35 are relatively short and would need be no longer than the width of the tapered portions 33 of Fig. 12. Of course, this would leave short humps along opposite sides of the mat, but these would be trimmed off and would not appear in the finished mat.

It will be seen that I have provided means for preventing excess or unnecessary stretching in the region or regions where it might occur or of compensating for and nullifying the effects thereof by providing spaces for the excess material to accommodate itself without forming folds in the rubber and without affecting the appearance of the finished mat.

Above I have described the production of contoured automobile floor mats previously molded and vulcanized, which mats are flexible throughout. It is to be understood, however, that the invention is not limited to the production of automobile mats for I have used the process constituting the subject matter of this invention to advantage in contouring other pre-molded and pre-vulcanized products having various degrees of flexibility and using various rubber compositions, including hard rubber compositions when relatively stiff contoured articles are desired which, though not used for floor coverings, are designed to have an artistic molded design on the surface which is exposed, such as articles used in forming the walls and the under side of the tops of automobiles. The invention may be used to advantage also in forming articles from plastic materials other than rubber, and I therefore do not desire to be confined to any particular material or to the manufacture of any particular product except to the extent that I expressly limit myself in the appended claims. As pointed out above, the contouring operation does not affect the design which may be molded on the top surface of the mat or other article or any design which may be molded on its lower surface. I wish it to be clearly understood, however, that whether the finished article is a floor mat, other floor covering, or an article other than a floor covering, the present invention is not confined to the production of an article wherein a special design is molded on both surfaces, for in many, if not in most, instances the article will have a molded design on one surface only, and in some instances it may not have a molded design on either surface.

Having thus described my invention, I claim:

1. The method of making contoured vehicle floor mats from thermoplastic material which comprises molding and curing such material in substantially flat shape to provide a permanent design on a surface thereof, bringing cooperating mold members into clamping engagement with edge portions of the mat so as to form a fluid seal with the mat extending across a contouring recess provided in one of the mold members, and then applying heat and fluid pressure and causing a portion of the mat to be stretched and deflected into said recess whereby such portion is given a corresponding contour without substantially affecting the design previously imparted to the mat.

2. The method of making contoured vehicle floor mats from thermoplastic material which comprises molding and curing such material in substantially flat shape to provide a permanent design on a surface thereof, bringing cooperating mold members into clamping engagement with edge portions of the mat so as to form a fluid seal around the mat and between the mold members with the mat extending across a contouring recess provided in one of the mold members, and then supplying heat and introducing pressure fluid between the mat and the other mold member with the pressure fluid in direct contact with the mat and thereby causing a portion of the mat to be stretched and deflected into the recess and given a corresponding contour without substantially affecting the design imparted to the mat in the first molding operation.

3. The method of making contoured vehicle floor mats from thermoplastic material which comprises molding and curing such material in substantially flat shape to provide a permanent design on a surface thereof, bringing into clamping engagement with edge portions of the mat a pair of cooperating mold members having interengaging portions which deflect edge portions of the material out of the general plane thereof and thereby forming a fluid seal around the mat and between the mold members with the mat extending across a contouring recess provided in one of the mold members, and then supplying heat and introducing fluid pressure between the mat and the other mold member with the pressure fluid in direct contact with the mat and thereby causing a portion of the mat to be stretched and deflected into the recess and given a corresponding contour without substantially affecting the design imparted to the mat in the first molding operation.

GEORGE N. EDWARDS.